April 7, 1931.  C. R. PADGETT  1,800,100
DEMOUNTABLE RIM
Filed Feb. 11, 1927
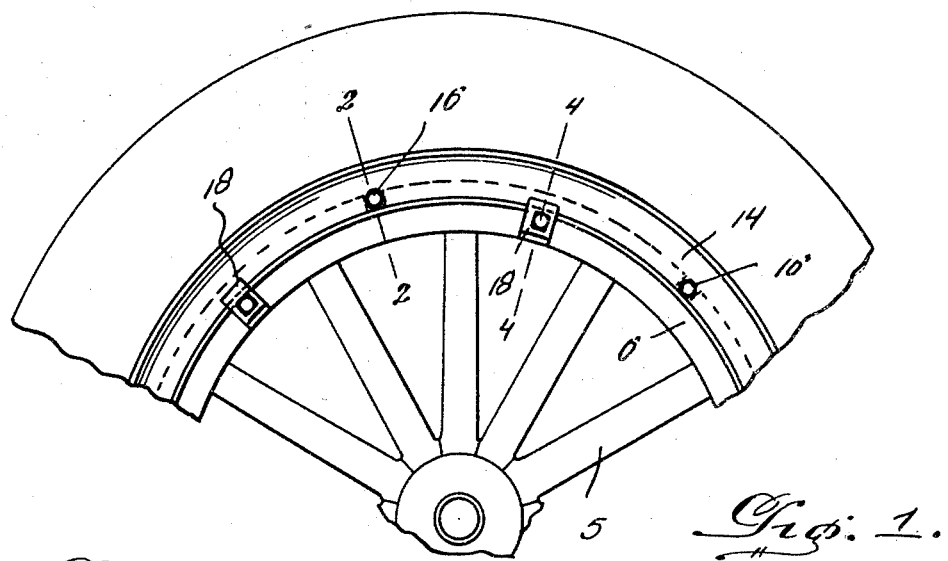
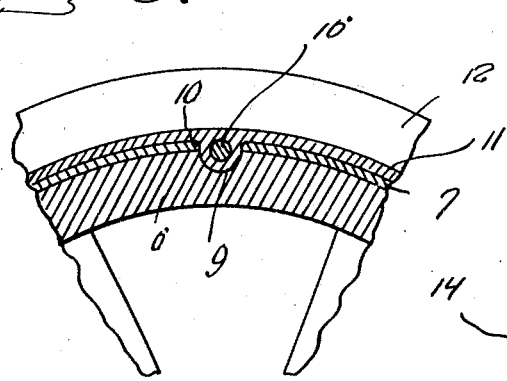
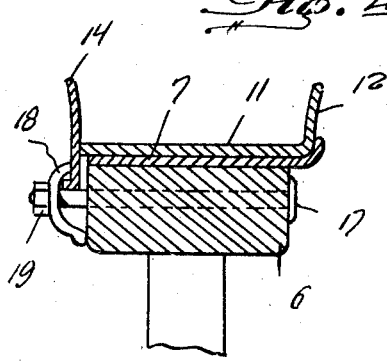
Inventor
Claude R. Padgett,
By 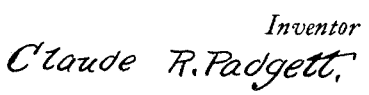
Attorney Patented Apr. 7, 1931

1,800,100

UNITED STATES PATENT OFFICE

CLAUDE RAY PADGETT, OF MOUNT CARMEL, ILLINOIS

DEMOUNTABLE RIM

Application filed February 11, 1927. Serial No. 167,474.

This invention relates to new and useful improvements in demountable rims for automobile wheels and has for its primary object to provide a combined wheel and rim construction wherein the entire rim may be readily removed from the wheel after which the same may be easily disassembled to permit the tire to be released therefrom.

Furthermore the rim per se is of such a construction as to permit of the easy application of a tire thereon, and this without requiring the use of any of the various tire applying or removing tools.

A still further object is to provide a demountable rim of this character that is extremely simple of construction, inexpensive of manufacture, and of such a nature as to permit the rim to be removed from the tire and to permit the rim to be taken apart without requiring any more than the usual rim nut wrench or a similar conventional tool.

With the foregoing and other objects in view as the nature of the invention will be better understood, the same comprises the novel form, combination and arrangement of parts hereinafter more fully described, shown in the accompanying drawing and claimed.

In the drawing wherein like numerals indicate corresponding parts throughout the several views:

Figure 1 is a fragmentary outer side elevation of an automobile wheel equipped with my improved demountable rim.

Figure 2 is a transverse section taken substantially upon the line 2—2 of Figure 1.

Figure 3 is a fragmentary circumferential view taken substantially upon the line 3—3 of Figure 2, and Figure 4 is a transverse section taken substantially upon the line 4—4 of Figure 1.

Now having particular reference to the drawing, 5 designates generally a conventional spoked automobile wheel including a felly 6. In carrying out my invention, there is rigidly secured upon this felly a stationary rim 7, the inboard side of which projects beyond the inboard side of the felly and is formed at said inboard side with a radially outwardly extending curved flange 8. At spaced points throughout the circumference of the felly the same is formed with transversely extending rounded notches 9 that open radially outwardly of the felly 7 as clearly indicated in Figures 2 and 3. At these notches the outboard side of the stationary rim 7 is formed with slots 10 as shown in the same figures.

The demountable rim per se consists of a circular band 11 for disposition upon the stationary rim 7 of the felly 6 and being flanged at its inboard side as at 12. The radially inner peripheral base of this band 11 is formed at its outboard side with transversely extending internally threaded sleeves 13 for engagement through the slots 10 and within the notches 9 of the rim 7 and felly 6 respectively.

The rim further includes a retaining ring 14 for disposition against the outboard edge of the band 11, while the radially inner edge thereof is formed with an axially outwardly extending circumferential flange 15. This ring 14 is formed with spaced openings for registration with the internally threaded sleeves 13 of the rim band 11 so that headed screws 16 may be passed therethrough and secured within said sleeves so as to positively connect the ring 14 to the rim band 11.

Extending through axial bores in the felly 6 beneath the radially outer peripheral face thereof and intermediate the notches 9 therein are elongated headed bolts 17, over the ends of which at the outboard side of the felly are adapted to be disposed conventional rim lugs 18 for engagement at their radially outer ends over the flange 15 of the ring 16, after which nuts 19 are threaded upon the bolts for tightly securing the lugs against the ring 14 and felly 6, see Figure 4.

It will thus be obvious that by reason of the sleeves 13 fitting within the notches 9 of the felly 6 and the slots 10 of the rim band 7, the rim will be prevented from circumferential movement upon the felly. Furthermore by releasing the lugs 18, the entire rim may be removed from the felly after which the removal of the screws 16 will permit the detachment of the tire retaining ring 14 so that the tire may be easily slipped off or on the rim band 11.

In view of the foregoing description when considered in conjunction with the accompanying drawing it will at once be apparent that I have provided a highly novel, simple and efficient demountable tire rim that is well adapted for all the purposes heretofore designated, and even though I have herein shown and described the invention as consisting of certain detail structural elements it is nevertheless to be understood that some changes may be made therein without affecting the spirit and scope of the appended claims.

Having thus described the invention, what I claim is:—

1. In a sectional rim for automobile wheels, wherein the wheel felly is provided with transverse notches in its radially outer peripheral face and at the outboard side thereof, a circular band mounted on the peripheral face of the felly and having a rim abutting flange at its inboard edge, the outboard edge of said band being formed with slots in registry with the notches in the felly, a tire carrying band for disposition upon the first mentioned band, a radially outwardly extending flange formed on the inboard edge of the tire carrying band for engagement with the flange on the first mentioned band, transversely extending internally threaded sleeves formed on the radially inner peripheral face of said tire carrying band at the outboard edge portion thereof for engagement within the slots and notches of the first mentioned band and wheel felly respectively, a tire retaining ring for disposition against the outboard edge of the tire carrying band adapted for cooperation with the flange of the tire carrying band for retaining a tire on said tire carrying band, bolts passing through said tire retaining ring for threaded reception in said sleeve, for securing said ring to said tire retaining band, and additional bolts passing through said felly in alternate relation with respect to the notches in the felly, and said tire retaining ring having its radially inner circumferential edge resting on said last mentioned bolts, and means carried by said last mentioned bolt and engaging said tire retaining ring for retaining the parts assembled upon said felly against lateral displacement in one direction with respect to the felly.

2. In a sectional rim for vehicle wheels, wherein the wheel felly is provided with transverse notches, in its radially outer peripheral face, and at the outboard side thereof, a tire carrying band for disposition on said felly, a tire engaging flange formed on the inboard side of said band, sleeves formed on the radial inner peripheral face of the band at the outboard side portion thereof for reception in the notches in said felly, whereby to retain said band on said felly against circumferential and axially inward movement relative to the felly, a tire retaining ring for disposition against the outboard side of the tire carrying band and the threaded sleeves formed thereon, bolts passing through said rings for reception into said sleeves for retaining said ring secured to said tire carrying band, and means carried by said felly and engaging said tire retaining ring for retaining said tire carrying band against axial outward movement relative to the felly.

In testimony whereof I affix my signature.

CLAUDE RAY PADGETT.